United States Patent Office 3,362,533
Patented Jan. 9, 1968

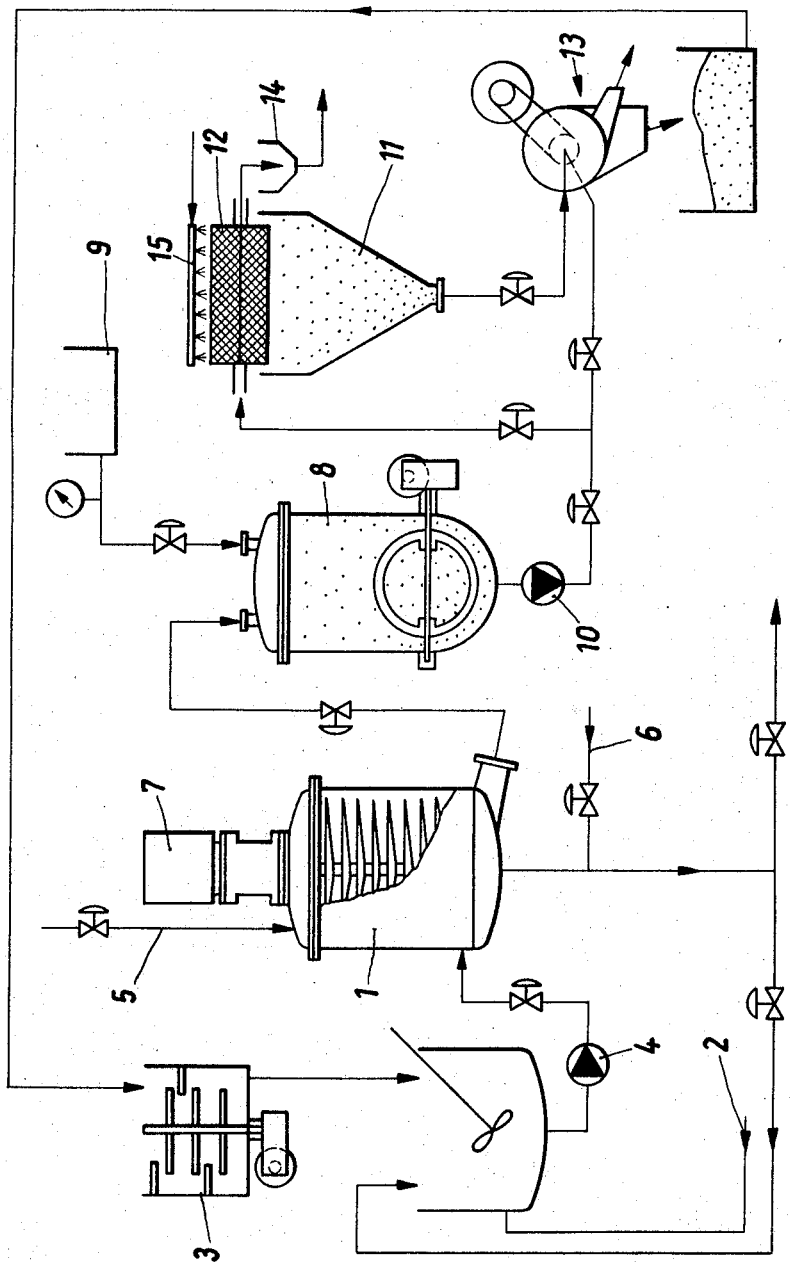

3,362,533
PROCESS FOR THE FILTRATION OF ARTIFICIAL SILK AND SYNTHETIC FOIL SPINNING MATERIALS BY MEANS OF FILTER SURFACES TO WHICH AN ALLUVIAL MEDIUM IS APPLIED
Hans Müller, Erlenbach, Zurich, Switzerland
Filed May 28, 1964, Ser. No. 370,942
Claims priority, application Switzerland, May 28, 1963, 6,621/63; June 5, 1963, 6,962/63; July 17, 1963, 9,004/63; July 30, 1963, 9,504/63; Nov. 20, 1963, 14,291/63
8 Claims. (Cl. 210—75)

ABSTRACT OF THE DISCLOSURE

Filter aids such as are used in the filtration of spinning solutions arising in the manufacture of synthetic silks and synthetic foil and which consist of synthetic granulates associated with the filter proper are regenerated by dissolving the slimy coating formed on the filter aid through incompletely dissolved swelling substances and cellulosic fibers in alkali after completion of the filtering operation and then subjecting the filter aid to the action of a wet classifier to remove residual cellulose fibers and impurities whereupon the filter aid is recirculated into the filtration operation.

The process permits reuse of the filter aid for extended periods of time.

---

The filtration of artifical silk and synthetic foil spinning materials is extremely important and has hitherto been done only in an unsatisfactory manner. New attempts are continually being made to make the process simple and cheap but so far no method has been found to meet these requirements. Because the viscosity of the solutions is usually very high, filters with a large filter surface have to be used in such cases. Filtering of this type is therefore still carried out on known filter presses which are very complicated, laborious and unhygienic to clean. Such spinning materials are still filtered through cloths, whether the cloths are made of natural or synthetic fibres.

Attempts to filter artificial silk and synthetic foil spinning materials with the aid of alluvial materials, i.e. through a basic alluvium of filtering aids such as kieselguhr, asbestos and the like have been unsuccessful for various reasons. For example, consumption of such filtering aids was much too expensive, owing to the fact that only relatively little substance could be filtered per kg. of filtering aids consumed.

On the other hand the filtering aids which have been tried so far and which are reasonably priced are not resistant to the above mentioned spinning materials and bring impurities into the solutions. This is the case, for example, when kieselguhr is used for filtering xanthogenate-viscose. If xanthogenate-viscose is filtered through an alluvium of kieselguhr, then because of the strong alkalinity some silicic acid goes into the solution. The dissolved silicic acid clogs the spinnerets of the spinning machines and causes thread breakage.

A precise study of the filtration of such xanthogenate-viscose is published in an article by F. Kolos and Erich Treiber, Svensk Papperstiduing No. 66 of 15th October 1963. This study represents the present state of this branch of filtration technique. The article states that a low specific flow performance is necessary to achieve good filtration, i.e. to obtain a pure filtrate. (". . . A low filtration speed in both the yield and the quality . . . .") Filtrations are carried out on conventional filter media such as paper, cotton cloths, plastic cloths and linters. In practice such filtrations are effected with a specific flow performance of 15 to 25 litre viscose per sq. metre of filter surface per hour in the case of normal viscoses and 5 to 10 litre per sq. metre per hour in the case of very highly viscous products. The purity of the filtered viscoses can be ascertained in various ways. The number of dirt particles per cc. which are not removed by filtration can be counted microscopically. A filter value may also be determined, that is to say, the reduction in filtration speed through a standardised filter at constant filtration pressure. This value is known as the kw. value. The smaller the kw. value, the better was the filtration. In the methods practised hitherto, using cloths and the like, filtering usually takes place in three successive stages. In the case of normal viscose kw. values of 10 to 18 are obtained after the third stage.

It should also be mentioned that the dirt particles to be removed by filtration chiefly consist of so-called swelling substances. These are non-dissolved or only half dissolved cellulose particles. Fibres of undissolved cellulose are also present in the unfiltered product. If in conventional filtration through cloths the flow per square metre is increased too greatly, then the swelling substances are pressed through the pores of the cloths and are still present in the filtrate.

The invention discloses a process enabling such filtration with alluvial materials to be carried out so as to make the specific flow performances 5 to 10 times greater than those obtained in conventional filtration. The degree of filtration obtained on filter presses in three steps is now achieved in a single step. Filters involving no hand operation and no wear on filter cloths may be used. The cost of filtration can accordingly be appreciably reduced as a result of the saving in labour, the lower investment costs, the smaller consumption of filtering material and the possibility of complete automation.

The process according to the invention is characterised by the use of a regenerable alluvial medium which is resistant to the viscose solution used and which at the end of each filtration process is suspended in a liquid, freed therein from the swelling substances, fibre and dirt particles acquired during filtration, and fed back for the following filtering process. To this end it is an advantage to use a filter which enables the alluvial medium to be whirled up in a washing solution at the end of the filtration process together with the impurities filtered out, and all of them to be removed without opening the apparatus. The filters suitable for this purpose are preferably disc rotary filters with a rotary cleaning action, wherein the residue is centrifuged or sprayed off by rotating the filter elements after filtration and is cleared out of the filter.

A relatively thick layer of alluvial material may be applied to the horizontal elements of such filters without involving any danger of the layer sliding or dropping off. Filters with vertical elements may also be used but are more sensitive to the above mentioned effect.

The substances used is filtering aids are firstly absolutely resistant to the viscose solution to be filtered and to any additives and secondly are capable of thorough and simple regeneration. As mentioned above, the dirt particles to be moved from the viscose solutions consist chiefly of swelling substances and of cellulose fibres which are not attacked. Regeneration of the alluvial materials thus involves separating this dirt therefrom as completely and simply as possible. The separation may be effected either chemically or mechanically, or a combination of both methods may be used. In the case of xanthogenate-viscose, however, the alluvial material must be resistant to alkalis and small quantities of carbon disulphide still present. In addition it must be easy to separate from the swelling substances and fibres.

In the case of substances which are difficult to filter it is known that a certain quantity of a filtering aid may be added to the unfiltered solution in addition to the alluvium forming the actual filtering layer, so as to keep the filtering layer porous as long as possible. Such an addition is in many cases very advantageous for the present process also. The same granulates may be used as for the alluvial layer, although in certain cases the granulates for the alluvial layer and those for the addition may have different grain sizes.

For the above mentioned spinning materials it has been found that the amount added may be regulated in dependence of the temporary rise in pressure on the filter. This method is important in that such spinning materials are often made with discontinuous operation and the proportion of swelling substance and fibres, i.e., the degree of soiling, varies accordingly. If the degree of soiling is high then the rise in pressure in the filter is greater over a length of time but may be correspondingly reduced by increasing the amount added. If the grain size used for the addition is not the same as that used for the alluvium, the granulates may be split up into their original components again after regeneration by means of classification or screening.

A granulate of polyvinyl chloride is extremely suitable. It produces flawless filtration, and for regeneration purposes a suspension of polyvinyl chloride in water can easily be separated from the swelling substances and fibres of lower specific weight by decantation, flotation or a combination of these two methods. Decantation is effected either statically in a container with an agitator, in a centrifuge or in a hydrocyclone. The material may be decanted in this way several times in succession and washed with liquid each time between the decantations. Chemical treatment of the suspension may improve the purifying effect or may be the only thing which makes the latter possible. After the last wash the granulate is freed as far as possible from liquid in the filter or in a centrifuge and is used for the next filtration in either a moist or a completely dry state. The chemical stability of polyvinyl chloride enables it to be chemically separated from the dirt particles, the latter being substantially dissolved and washed out, for example through treatment with lyes and acids.

It may often be an advantage to use granulates of varying grain size. If the severest possible filtration is desired finer granulates are used. If less severe filtration is sufficient coarser grain sizes are suitable and in exchange increase the specific filtering performance.

If the residue suspended in water or lye is treated with carbon disulphide satisfactory solution of the swelling substances and fibres is obtained, i.e., these substances are xanthogenated by the carbon disulphide and go into solution. In theory of course it would also be possible to dissolve the swelling substances and fibres in Schweitzer's reagent, but this would be relatively expensive and laborious.

As mentioned above, regeneration may be carried out in disc rotary filters themselves. After filtration the residual viscose is taken out of the apparatus, then the filtration residue is whirled up in water by rotation or spraying in the filter itself and is chemically and mechanically treated. This method has the advantage that fewer apparatuses are necessary but the disadvantage that the filter is out of action for the time taken up in regeneration. For mechanical regeneration decantation containers, flotation apparatus, decanting centrifuges, screen classifiers, shaking screens or combinations of these may be used, and for chemical treatment suitable agitating containers.

If the regeneration of the alluvial medium is to be chiefly chemical it is not necessary for this medium to have a particularly high specific weight. Other plastic granulates such as polyethylene, polypropylene, polyacrylonitrile and the like may also be used. Filtering through special carbons also produces a good filtration effect. However, chemically satisfactory carbons are relatively expensive, while cheap carbons are not sufficiently pure; carbons can also be separated less well by decantation and flotation.

It has also been found that in the regeneration of the alluvial materials the separation of the granulates from the non-attacked fibres need not be 100%. A small proportion of fibres causes no trouble in subsequent filtration and may on the contrary slightly improve it. But if the fibre portion is not to be permanently increased it must be at least partially separated (by screening in water or in a dry state). If viscose containing no fibres has to be filtered very thoroughly some fibrous material, for example in the form of cellulose or soda cellulose, may be added to the alluvial material. Filtration through cellulose or soda cellulose alone is of course possible, but with lower specific filtering performances than those obtained when granulate is added.

The process according to the invention will be illustrated by an example with the aid of a drawing.

A xanthogenate viscose solution for spinning into rayon or staple fibre artificial silk containing about 8 to 10% alpha-cellulose in soda lye and containing as impurities both swelling substances and cellulose fibres is filtered in a disc centrifugal filter 1 having a filtering area of 20 square metres. Filtration is effected on metal fabrics which are covered with a mixture of polyvinyl chloride granulate and viscose by means of circulation before the filtering process. About 1.5 kg. of granulate are deposited per square metre of filtering surface. After this deposition the filter is switched over to filtration. Before it enters the filter the unfiltered viscose 2 has 0.4% polyvinyl chloride granulate added to it from a dosing appliance 3. It is then forced through the filter 1 by a pump 4 with a flow performance of 3000 litre per hour, corresponding to 150 litre per square metre per hour. The filtration pressure rises within about 60 hours (depending on the grain size of the polyvinyl chloride granulate) from 3 to 8 atmospheres excess pressure. When the material has passed though once the kw. values are from 3 to 10. Filtration is interrupted and the unfiltered viscose left in the filter is forced back to the container with the raw viscose (not shown).

The filter cake is as far as possible freed from viscose by blowing compressed air through it out of a pipe 5 for about half an hour, then it is washed though on the filter plates with water from a pipe 6 for approximately 10 minutes. The bundle of filters is then rotated by a motor 7 and the filter cake suspended in a little water and forced into an agitator 8. After being rewashed with water the filter 1 is clean and can be used for the next filtration. The suspension to be regenerated in the agitator 8, comprising the filtering aid polyvinyl chloride, the filtered swelling substances and fibres and a few other impurities (fragments of hardened viscose from the pipes and the like), is mixed with a little soda lye from a container 9 and heated to 80 to 90° C. by introducing steam. The whole is now agitated and simultaneously pumped into a specially constructed screen-flotation apparatus 11 by a pump 10. The alluvial material is decanted downwardly through a screen 12 rotating in water and is dehydrated in a suction strainer or a centrifuge 13. The material can now be reused for filtration in the moist state (containing 40% water if a suction strainer was used or 20% water in the case of a centrifuge). The cellulose fibres and other coarse-grained impurities are washed into a funnel 14 by the flow of water. They can be removed therefrom by sieving the waste water. The flotation screen drum 12 is sprayed with water from a nozzle appliance 15 in order to prevent the meshes of the screen from becoming clogged.

As already mentioned, regeneration may be varied mechanically and chemically. For example, the process carried out in the container 8 may be preliminary decantation or treatment with other chemicals. In the case of treatment with carbon disulphide and soda lye the non-attacked fibre particles may be dissolved in the closed container with slight heating.

The surplus carbon disulphide may be expelled by heating and collected in a cooler. It is also possible to dissolve the swelling substances and fibres in sulphuric acid, but this tends to darken the alluvial material unless the concentrations and temperatures are exactly controlled. Decantation in a decanter or flotation may be effected by adding a small quantity of wetting agent. In certain cases these processes are accelerated thereby. Wetting agents are materials which cause the particles to be wetted and thus allow them to settle better by removing clinging air from them.

The regenerating part illustrated is capable of serving a whole series of filters without any manual work being needed.

The economic advantages of the above process are considerable. Whereas in filter presses, which have only one-fifth to one-tenth of the specific performance, the expensive filter cloths are chemically and physically attacked and have to be discarded as faulty after every sixth to tenth filtration, as they can no longer be washed, the alluvial medium can be used any number of times with very little wastage (5 to 10%). As compared with filter presses, where the absolute amount of xanthogenate cellulose filtered per square metre (in the form of 10% viscose) until cleaning is only 250 to 350 kg., the process according to the invention yields 700 kg. and more. The latter also has the advantage that it can be carried out in an absolutely closed circuit and the workers are accordingly protected from the action of the poisonous carbon disulphide fumes.

I claim

1. A process for regenerating floatable filter aids used in the filtration of highly viscous synthetic silk and foil spinning solutions wherein the filter aid consists of an alkali-resistant granulate, the said process comprising dissolving the slimy coating formed on the filter aid by incompletely dissolved swelling substances and cellulosic fibers in alkali after completion of the filtration operation and thereupon removing the residual cellulosic fibers and impurities from the filter aid by subjecting the filter aid to the action of a wet classifier and removing from the separated filter air at least a major portion of the liquid so as to prepare the filter aid for reuse in the filtration process.

2. The process of claim 1 wherein the spinning solution is a xanthogenate-viscose solution.

3. The process of claim 1 wherein the alkali used in the treatment is a sodium hydroxide solution.

4. The process of claim 1 wherein the alkali treatment is effected with an alkaline carbon disulfide suspension adapted to dissolve impurities accumulated in the filtration operation.

5. The process of claim 1, wherein the filter aids during the alkali treatment are subjected to steam.

6. The process of claim 1 wherein the granulate consists of polyvinyl chloride.

7. The process of claim 1 wherein alkali treatment of the filter aid is carried out while the filter aid is within the filter.

8. The process of claim 1 wherein the filter aid is passed from the filter to a subsequent agitator for said alkali treatment.

References Cited

UNITED STATES PATENTS

| 2,020,693 | 11/1935 | Manley et al. | 210—75 X |
| 2,055,869 | 9/1936 | Manning | 210—75 |
| 2,607,954 | 8/1952 | Schneider et al. | 210—446 X |
| 2,971,648 | 2/1961 | Lane et al. | 210—75 |
| 3,023,893 | 3/1962 | Zaleoromski | 209—18 |

FOREIGN PATENTS

| 622,599 | 6/1961 | Canada. |
| 1,190,296 | 3/1959 | France. |

SAMIH N. ZAHARNA, *Primary Examiner.*